United States Patent

Usui

[11] Patent Number: 6,085,800
[45] Date of Patent: Jul. 11, 2000

[54] LAPPED STEEL TUBE

[75] Inventor: Masayoshi Usui, Numazu, Japan

[73] Assignee: Usui Kokusai Sangyo Kaisha Limited, Japan

[21] Appl. No.: 09/253,431

[22] Filed: Feb. 19, 1999

[30] Foreign Application Priority Data

Mar. 4, 1998 [JP] Japan ................................. 10-069357

[51] Int. Cl.[7] ................................................... F16L 9/02
[52] U.S. Cl. ........................... 138/142; 138/143; 138/171
[58] Field of Search .................................... 138/171, 170, 138/143, 142

[56] References Cited

U.S. PATENT DOCUMENTS

| | | | |
|---|---|---|---|
| 1,909,501 | 5/1933 | Quarnstrom | 138/171 |
| 2,104,884 | 1/1938 | Quarnstrom | 138/142 |
| 2,380,107 | 7/1945 | Hobrock | 138/171 |
| 2,508,465 | 5/1950 | Offinger et al. | 138/142 |
| 3,584,655 | 6/1971 | Frank et al. | 138/143 |
| 3,610,290 | 10/1971 | Anderson et al. | 138/143 |
| 4,495,003 | 1/1985 | Kubo | 138/143 |
| 4,558,721 | 12/1985 | Trudell et al. | 138/171 |
| 4,851,298 | 7/1989 | Fukuda | 138/171 |
| 4,853,297 | 8/1989 | Takahashi et al. | 138/171 |
| 5,265,793 | 11/1993 | Usui et al. | 138/143 |
| 5,958,602 | 9/1999 | Usui | 138/143 |

*Primary Examiner*—James Hook
*Attorney, Agent, or Firm*—Anthony J. Casella; Gerald E. Hespos; Michael J. Porco

[57] ABSTRACT

A lapped steel tube which is improved in resistances to the repeated high-pressure fatigue and the cavitation erosion, in the vibration resistance and in the fitting properties to eliminate the clearances between its inner, outer and intermediate pipes and to lower the production cost. The lapped steel tube comprises an outer pipe, an intermediate pipe and an inner pipe. The outer pipe is made of an electroseamed pipe, the intermediate pipe is made of a duplex-wound pipe or an electroseamed pipe, and the inner pipe is made of a seamless pipe. The outer, intermediate and inner pipes are lapped by drawing them together and are integrated by soldering the individual lapped faces.

8 Claims, 1 Drawing Sheet

LAPPED STEEL TUBE

BACKGROUND OF THE INVENTION

1. Field of the Invention

The present invention relates to a lapped steel tube which is arranged generally as an oil or air feed passage or a Diesel engine fuel injection pipe in automobiles or various kinds of machines or apparatus and which has a diameter of about 20 mm or less and a pressure resistance and mechanical strength.

2. Prior Art

The lapped steel tube of this kind is generally demanded to have stabilities in qualities such as fatigue strength or sealing properties. Especially, the Diesel engine fuel injection pipe is demanded to have resistances to repeated high pressure fatigues, cavitation erosion and vibrations from the engine or car body. The lapped steel pipe satisfying such demands has been exemplified by a construction in which inner, outer and intermediate pipes are made of duplex-wound pipes and soldered to one another or a construction in which the inner pipe is made of a seamless pipe whereas the outer and intermediate pipes are made of duplex-wound pipes and soldered to one another.

However, the lapped steel tube of the prior art thus constructed has defects, as will be described in the following.

The lapped steel tube having the inner, outer and intermediate pipes made of the duplex-wound pipes can be manufactured at a low cost. However, the individual pipe members are press-fitted and drawn so that they may be lapped, and the copper plating film, as applied in advanced to the whole lapped faces, is heated and soldered. As a result, the parent material is deteriorated by the twice soldering and heating treatments at the time of making the duplex-wound pipes and at the time of shaping the lapped steel pipes. At the same time, the SPCC (low-carbon steel), as used in the duplex-wound pipe in view of its excellent compactibility, has a low tension resistance and a low vibration fatigue strength so that the outer surface, from which the vibration fatigue is started by the vibrations to be applied for use, is liable to break and to have an inferior vibration resistance. Moreover, a step is formed, although small, on the axial mating seam (or seam portion) to be formed when the duplex-wound pipes are made, and may be left on the sealing face of the joint head formed by a pressing treatment, to deteriorate the sealing properties. As a result, a problem arises when the duplex-wound pipe is used as the outer pipe. When the soldering of the whole abutment face is insufficiently executed when the lapped steel pipe is to be formed, the abutting circumferential faces, as press-fitted to each other, are loosened to leave a clearance. As a result, the inner pipe is repeatedly expanded and shrunk by the abrupt pressure fluctuation or temperature change of the fluid (e.g., a fuel) to flow in the inner pipe. This raises another problem that the a resistance to the fatigue due to the repeated internal pressures is liable to drop. When the inner pipe is made of a seamless pipe, on the other hand, the resistance to the pressure fatigue and the leakage prevention are high, but the aforementioned problem of the duplex-wound pipe itself cannot be solved. Another problem arises in the higher cost than that of the duplex-wound pipe or the electroseamed pipe.

SUMMARY OF THE INVENTION

The invention has been conceived in view of the above-specified problems and has an object to provide a lapped steel tube which is improved in resistances to the repeated high-pressure fatigue and the cavitation erosion, in the vibration resistance and sealing properties and in the fitting properties to eliminate the clearances between its inner, outer and intermediate pipes and to lower the production cost.

According to the invention, there is provided a lapped steel tube comprising an outer pipe, an intermediate pipe and an inner pipe, wherein outer pipe is made of an electroseamed pipe, the intermediate pipe is made of a duplex-wound pipe or an electroseamed pipe, and the inner pipe is made of a seamless pipe, and wherein the outer, intermediate and inner pipes are lapped by drawing them together and are integrated by soldering the individual lapped faces.

In the invention, the reasons why the outer pipe is made of the electroseamed pipe, the intermediate pipe is made of the duplex-wound pipe or the electroseamed pipe, and the inner pipe is made of the seamless pipe will be described in the following.

The electroseamed pipe for the outer pipe can be suitably selected for a steel hoop having a wide range of magnification, as well known in the art, so that a steel having a high tension resistance can be selected. When the duplex-wound pipe is used, the twice heating treatments of the lapping of the pipe making and the soldering of the lapped pipe are not required so that the vibration resistance can be improved because of no deterioration of the parent material. Moreover, it is possible to manufacture a thinner pipe than the seamless pipe. Still moreover, the thickness can be accurately controlled to provide qualities and thicknesses over a wide range. Since the bead has been removed by cutting the outer surface, on the other hand, any step is not formed on the seam unlike the duplex-wound pipe, but the smooth surface can provide an excellent sealing property on the seal face of the head portion to be jointed, and the cost is low. On the other hand, the intermediate pipe is inferior in the fatigue resistance to the internal pressure because of the stepped portion of the inner mating face and in the sealing property because of the mating face of the outer surface. These defects can be eliminated by using the duplex-wound pipe as the intermediate pipe. Since the copper as the soldering material is present on the inner and outer surfaces, on the other hand, the later soldering operation is facilitated, and the cost is low. In addition, the seamless pipe (or seamless steel pipe) for the inner pipe is qualitatively more excellent in the pressure and fatigue resistances and the leakage prevention than the electroseamed pipe or the duplex-wound pipe. Moreover, the seamless pipe is featured by having a wider sizing range for the external diameter or the thickness and can cover various materials.

In the invention, therefore, considering the individual features, the inner pipe is made of the seamless pipe to retain the stability in the quality. Moreover, the outer pipe have roles to reinforce the inner pipe including the intermediate pipe and to form the seal face at the joint portion so that it is made of the electroseamed pipe having no step at the mating portion and capable of having excellent sealing properties, unlike the duplex-wound pipe. In addition, the intermediate pipe is made of less expensive duplex-wound pipe or electroseamed pipe than the seamless pipe so as to improve the vibration resistance and the fatigue resistance.

In the invention, on the other hand, means for integrating the three tubular members of the aforementioned outer, intermediate and inner pipes is exemplified by drawing and lapping them together. At this time, moreover, the three pipes can be easily integrated by plating one of the lapped faces (i.e., the circumferential faces of the respective pipes) with a soldering material such as copper and heating them to a temperature higher than the melting point of the soldering material after the drawing operation. Here, when the intermediate pipe is made of the duplex-wound pipe, the copper plating step can be eliminated to make the cost lower than the case of using another pipe.

DESCRIPTION OF THE PREFERRED EMBODIMENTS

Figure 1:
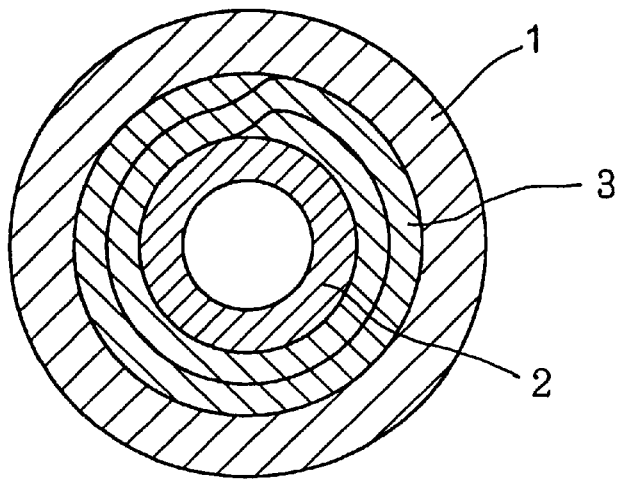
FIG. 1 is a longitudinal section showing one embodiment of a lapped steel pipe of the invention.

In these Figures, reference numerals 1, 2 and 3 designate an outer pipe, an inner pipe and an intermediate pipe, respectively.

In the lapped steel tube shown in FIG. 1, the outer pipe 1 is made of an electroseamed pipe, the inner pipe 2 is made of a seamless pipe, and the intermediate pipe 3 is made of a duplex-wound pipe. These three pipes are plated on their one lapped face with a soldering material such as copper and are drawn and lapped together. After this, the lapped pipes are integrated by heating them to a temperature higher than the melting point of the soldering material.

Figure 2:
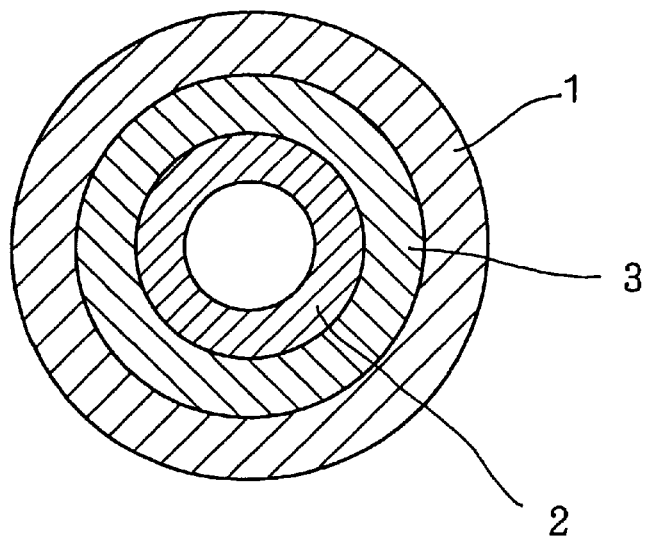
FIG. 2 is a longitudinal section showing another embodiment of the lapped steel tube of the invention.

In the lapped steel tube shown in FIG. 2, on the other hand, the outer tube 1 and the intermediate tube 3 are made of the electroseamed pipes, and the inner pipe 2 is made of the seamless pipe. In this lapped steel tube, therefore, the three pipes can also be integrated by means similar to the aforementioned one.

Here, the representative sizes of the outer pipe 1, the inner pipe 2 and the intermediate pipe 3 are enumerated in Table 1, although their external diameters and thicknesses are different depending on the materials:

TABLE 1

|  | Material | Kinds of Pipe | Ext. Dia. (mm) | Thickness (mm) | Int. Dia. (mm) |
|---|---|---|---|---|---|
| Outer pipe | (1) STKM12 | Electro-seamed a | 6 | 1.1 | 3.8 |
|  | (2) STKM13 | Electro-seamed a | 6.35 | 1.0 | 4.4 |
|  | (3) STKM12 | Electro-seamed a | 8 | 1.4 | 5.2 |
| Inner pipe | (1) DIN St52 | Seamless | 2.6 | 0.4 | 1.8 |
|  | (2) DIN St52 | Seamless | 3.2 | 0.6 | 2.0 |
|  | (3) STS480 | Seamless | 3.8 | 0.8 | 2.2 |
| Int. pipe | (1) SPCC | Duplex-Wound | 3.8 | 0.6 | 2.6 |
|  | (2) SPCC | Duplex-Wound | 4.4 | 0.6 | 3.2 |
|  | (3) STKM12 | Electro-seamed b | 5.2 | 0.7 | 3.8 |

Here, letter "a" in Table 1 designates an extended electroseamed pipe, and letter "b" designates an electroseamed pipe which is formed of a hoop material plated on its both faces and which is extended.

As has been described hereinbefore, the lapped steel tube according to the invention comprises an outer pipe of an electroseamed pipe, an intermediate pipe of a duplex-wound pipe or an electroseamed pipe, and an inner pipe of a seamless pipe, and the outer, intermediate and inner pipes are lapped by drawing them together and are integrated by soldering the individual lapped faces. As a result, the lapped steel tube is excellent in the resistance to the repeated high-pressure fatigue and the cavitation erosion and in the high resistance to vibrations and the high fitting properties and is highly usable for its low cost.

What is claimed is:

1. A lapped steel fuel injection tube comprising:

a seamless inner pipe formed from steel and having substantially cylindrical inner and outer surfaces;

an intermediate pipe formed from steel and having substantially cylindrical inner and outer surfaces, said inner surface of said intermediate pipe being opposed to said outer surface of said seamless inner pipe with a layer of a solder material therebetween;

an electro-seamed outer pipe formed from steel and having a cylindrical inner surface opposed to the outer surface of said intermediate pipe with a layer of solder material therebetween, said electro-seamed outer pipe having a cylindrical outer surface substantially free of steps thereon; and said lapped steel fuel injection tube being drawn and heated such that the solder material secures the cylindrical inner and outer surfaces of the intermediate pipe to the cylindrical outer surface of the seamless inner pipe and the cylindrical inner surface of the electro-seamed outer pipe respectively.

2. A lapped steel fuel injection tube according to claim 1, wherein the soldering material is a copper plating.

3. A lapped steel fuel injection tube according to claim 1, wherein said electro-seamed outer pipe is made of STKM12 or STKM13.

4. A lapped steel fuel injection tube according to claim 1, wherein said seamless inner pipe is made of DIN St52 or STS480.

5. A lapped steel fuel injection tube according to claim 1, wherein said intermediate pipe is a duplex-wound pipe.

6. A lapped steel fuel injection tube according to claim 5, wherein said duplex-wound pipe is made of SPCC.

7. A lapped steel fuel injection tube according to claim 1, wherein said intermediate pipe is an electro-seamed pipe.

8. A lapped steel fuel injection tube according to claim 7, wherein said electro-seamed intermediate pipe is made of STKM12.

* * * * *